Nov 24, 1953
S. A. SCHERBATSKOY
2,660,665
SEARCH SIGNAL APPARATUS FOR DETERMINING THE LISTENING
HABITS OF WAVE SIGNAL RECEIVER USERS
Filed Oct. 24, 1947
4 Sheets-Sheet 1
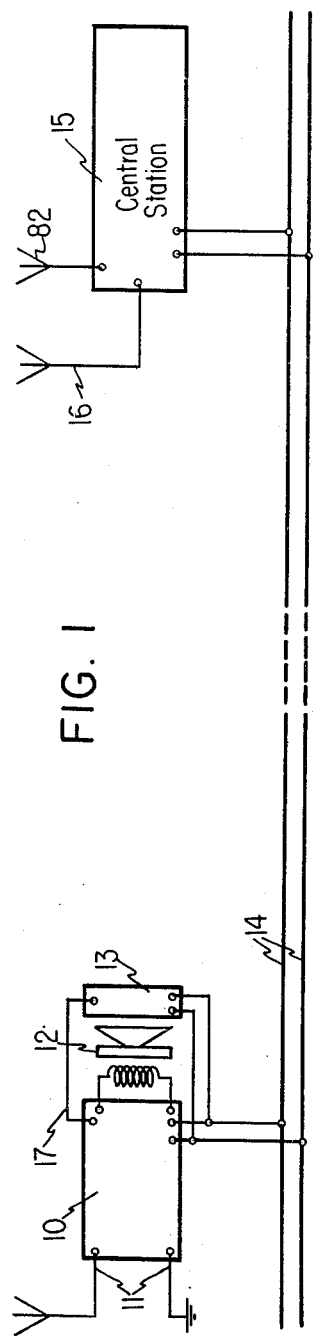
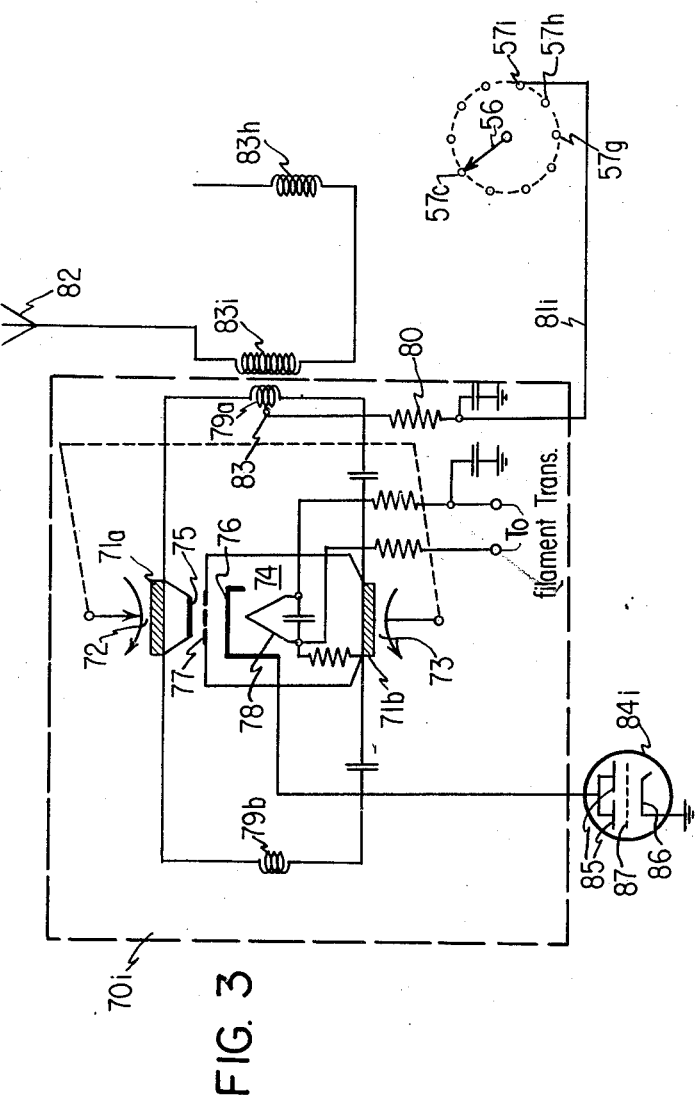
FIG. 1
FIG. 3
INVENTOR.
Serge A. Scherbatskoy
BY
Richard D. Mason
Attorney

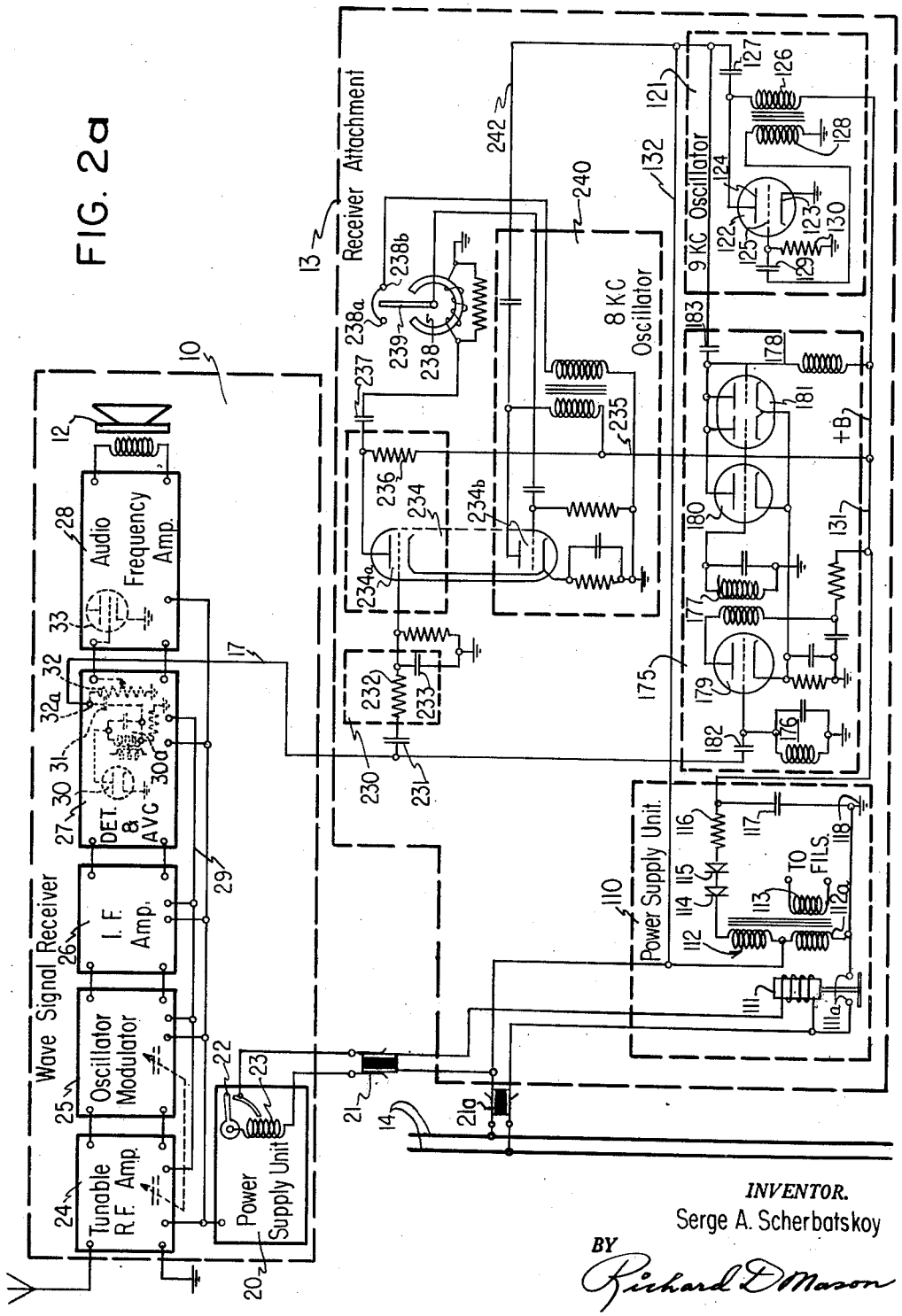

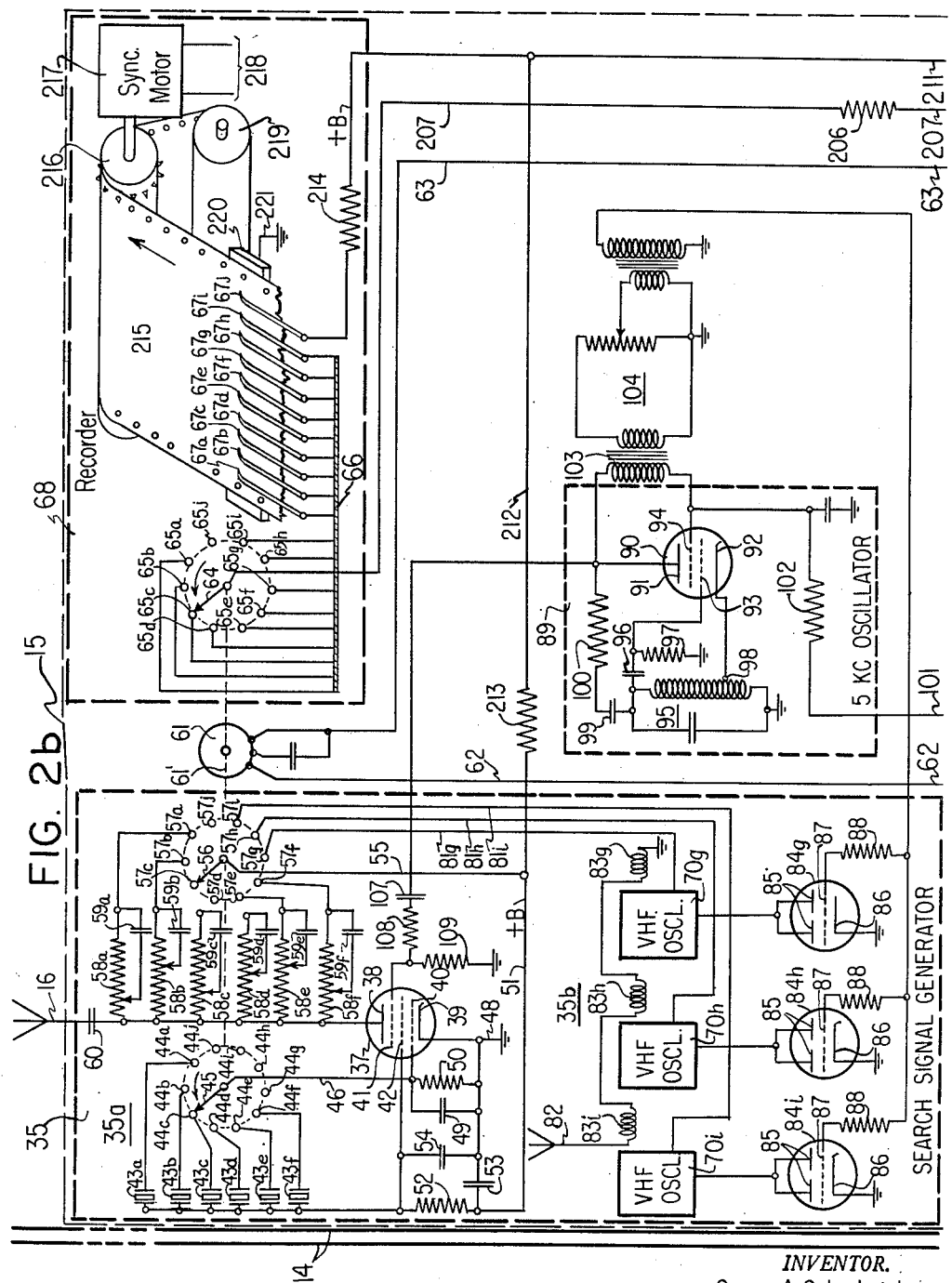

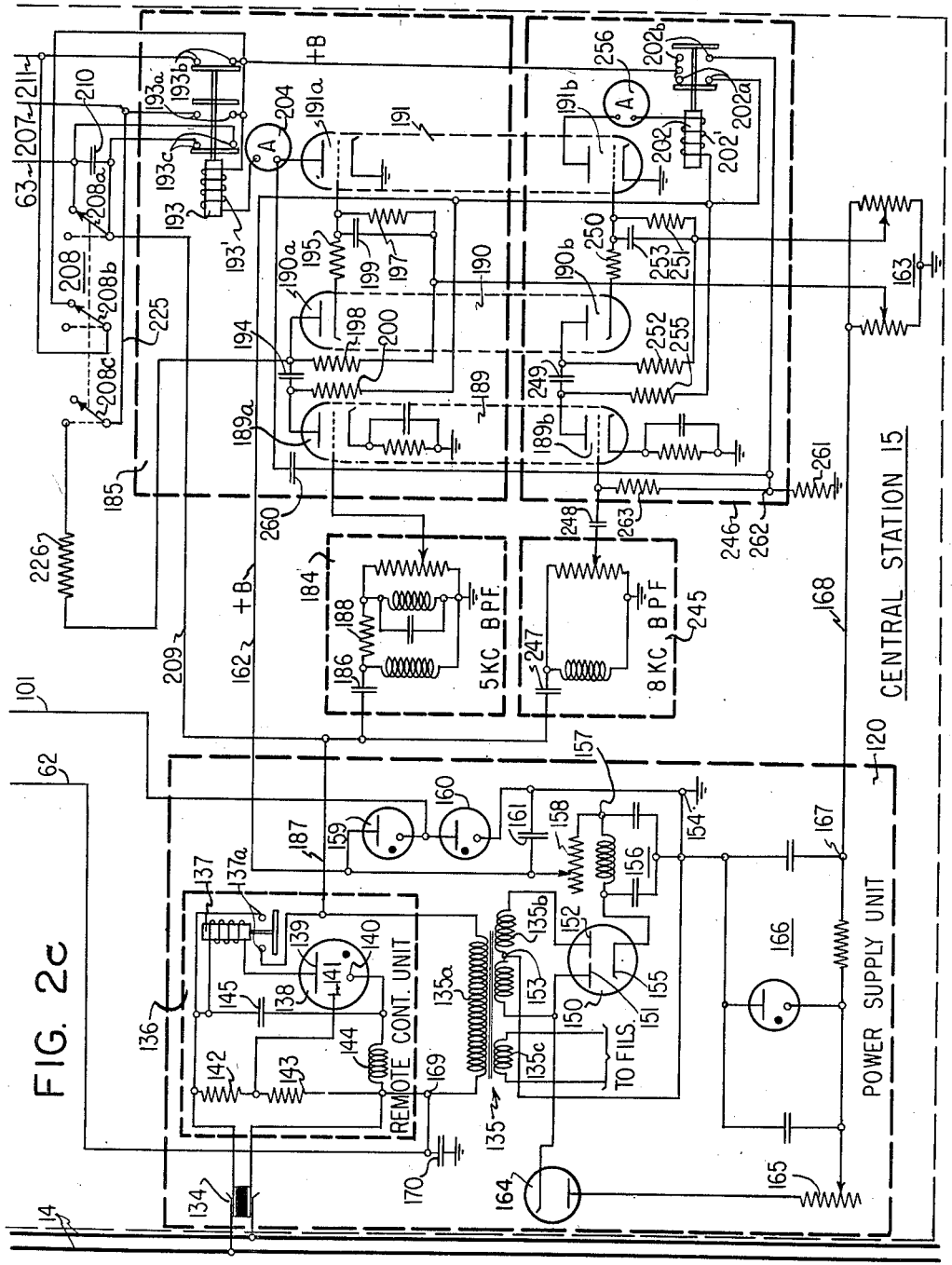

UNITED STATES PATENT OFFICE 2,660,665

SEARCH SIGNAL APPARATUS FOR DETERMINING THE LISTENING HABITS OF WAVE SIGNAL RECEIVER USERS

Serge A. Scherbatskoy, Tulsa, Okla., assignor to A. C. Nielsen Company, Chicago, Ill., a corporation of Illinois Application October 24, 1947, Serial No. 781,989

8 Claims. (Cl. 250—2)

The present invention relates to apparatus for determining the listening habits of users of wave signal receivers. More particularly the present invention is concerned with such apparatus of the type employing a search signal generator, the search signal output of which causes no disturbing heterodyne note or squeal in the wave signal receiver being metered or monitored. Specifically the present invention is an improvement on the arrangements disclosed and claimed in co-pending Scherbatskoy application, Serial No. 781,988, and co-pending Richards application, Serial No. 781,786, filed concurrently, herewith, and both assigned to the same assignee as the present application.

In the above mentioned co-pending applications there are disclosed and claimed various arrangements of the so-called "search signal type" of apparatus for obtaining with instrumented methods a continuous record of the transmitting stations to which a wave signal receiver is tuned, from which it is readily possible to analyze the listening habits of the users of such wave signal receiver. In such instrumented methods of determining the listening habits of wave signal receiver users the receivers in a large number of homes are metered or monitored to afford the basic information. From this information a statistical analysis of the various factors affecting the sales effectiveness of particular radio programs may accordingly be arrived at. In such a system employing instrumented methods it is contemplated that the selection of the system collaborator homes—that is the homes in which wave signal receiver use is to be logged—shall be on the basis such that all of the various factors, as for example the number of potential listeners, economic affluence, religion, etc. which normally affect any process of sampling public opinion are accounted for on a weighted basis.

In the search signal type of device described and claimed in the above-mentioned co-pending applications a search signal generator is employed which, in a more specific arrangement, cyclically, as for example, once per minute, scans the frequency spectrum by sending out a search signal which continuously or discontinuously varies in frequency during the cycle. This search signal has such a frequency composition that when the search signal frequency bears a predetermined relationship to that of the pass band to which the wave signal receiver being logged is tuned a response is produced in the wave signal receiver. In at least one embodiment of the search signal type of device, a single frequency component or monochromatic signal such as the output of a 5 or 6 kc. oscillator is superimposed on the search signal. The response produced in the wave signal receiver which might be referred to as a search tone is a signal having a frequency corresponding to the output of the 5 or 6 kc. oscillator. This response must be capable of being measured and this is accomplished by transmitting it to a recorder unit where a record of the response is made, the position of the response during the scanning cycle of the search signal generator being indicative of the particular frequency channel or pass band to which the wave signal receiver is tuned. By employing a monochromatic signal it is possible to make the response so weak as to be substantially inaudible, and yet with sufficient filtering and amplification it is capable of being measured without difficulty.

Since the strength of the search tone is greatly affected by the conditioning of a receiver automatic volume control system for transmitter signals of various strengths, there will be times when there is produced an audible heterodyne note during the scanning cycle as the frequency of the search signal approaches and passes beyond the frequency of the carrier to which the wave signal receiver is tuned. In the above-mentioned co-pending Scherbatskoy application there are disclosed and claimed various means for producing a search signal which is substantially incapable of producing a heterodyne note due to intermodulation of the station carrier and the search signal. One such search signal included a random phase modulation component.

In the co-pending Richards application there is disclosed and claimed a so-called "side frequency" search signal type of apparatus in which a crystal type of search signal generator is employed, each crystal having a natural frequency differing from the frequency of a particular transmitting station to which the wave signal receiver might be tuned by exactly 5 kc. During a scanning cycle all of the crystals are rendered effective successively so as to produce a search signal the frequency of which changes in a stepwise manner and each step differing by exactly 5 kc. from the frequencies of various transmitters which might be tuned in by the wave signal receiver being monitored. This type of device does not produce a disturbing variable pitch heterodyne note since the stepwise varying search signal comprises a succession of frequencies differing by an exact amount, namely 5 kc. from the frequencies of various transmitters which are capable of being tuned in by the wave signal receiver. However, this so-called "side frequency" search signal generator does not produce a symmetrical response if the wave signal receiver is mistuned. It is a well-known fact that a receiver user often mistunes the receiver slightly sometimes above and sometimes below the exact transmitter frequency with a resultant asymmetrical response depending both upon the degree and direction of mistuning. Also, with the "side frequency" search signal type of device the 5 kc. search tone or response in the receiver is obtained by virtue of the 5 kc. difference in frequency between the search signal produced as a result of a particular crystal which is rendered effective and the corresponding transmitter signal tuned in by the wave signal receiver being monitored. Consequently, the frequency of the search tone or response produced in the receiver is dependent upon the difference of two relatively high frequencies, i. e., the frequency of the transmitter tuned in by the wave signal receiver, and the frequency of the search signal at the instant during the cycle where the search signal frequency differs by 5 kc. from the frequency of said transmitter. Even though the percentage of error of each of these frequencies was small, the percentage error of a relatively low difference frequency might be very high, and as a result the frequency of the search tone is somewhat unstable. Furthermore, in view of the fact that most modern wave signal receivers are provided with automatic gain control means, the intensity of the search tone produced by virtue of the 5 kc. frequency difference between the "side frequency" search signal and the transmitter frequency does not vary directly with the intensity of the search signal to produce the desired constantly rising characteristic. It would be desirable to enjoy the advantages of the side frequency search signal type of apparatus which eliminates the variable pitch heterodyne note due to intermodulation of the search signal and the station carrier, while still obviating the above-mentioned disadvantages.

Accordingly, it is an object of the present invention to provide a new and improved search signal type of apparatus for recording the listening habits of wave signal receiver users wherein the search signal produces substantially no heterodyne note in the wave signal receiver being monitored or metered.

It is another object of the present invention to provide a so-called "center frequency" search signal generator with means to produce rigorous frequency control of the search signal so that no disturbing heterodyne note in the wave signal receiver being monitored is produced.

It is another object of the present invention to provide a new and improved search signal type of apparatus for recording the listening habits of wave signal receiver users in which the frequency stability of the search tone or receiver response is very high.

Still another object of the present invention is to provide a new and improved search signal type of apparatus for recording the listening habits of wave signal receiver users in which the characteristic of intensity of search tone versus intensity of search signal is a constantly rising characteristic.

It is another object of the present invention to provide a search signal type of apparatus in which only a symmetrical response or search tone is produced in the receiver regardless of the mistuning of the receiver.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which:

Fig. 1 is a block diagram of a search signal type of apparatus embodying the present invention for monitoring a wave signal receiver;

Figs. 2a, 2b, and 2c are diagrammatic illustrations showing first, second and third portions of the system of Fig. 1 arranged so as to be united into a single disclosure for illustrating the details of the system of Fig. 1, Fig. 2a showing the details of the wave signal receiver and receiver attachment, and Figs. 2b and 2c showing the details of the central stations; and Fig. 3 is a schematic diagram of a detail of the arrangement shown in Fig. 2b.

In accordance with the present invention there is provided a search signal type of apparatus for metering or monitoring a wave signal receiver to produce a record with respect to time of the tuning condition of such receiver. The search signal generator comprises means for producing a signal varying in frequency in a series of successively occurring steps, each step comprising a discrete frequency falling within various bands to which the receiver is likely to be tuned. The search signal generator operates to produce the signal of stepwise varying frequencies during a scanning cycle preferably having a period of one minute. The spectral composition of the cyclically produced search signal includes a modulation component preferably in the form of a monochromatic frequency capable of producing a response in the wave signal receiver in the form of a search tone. The instant during the search cycle that a search tone or response is produced in the wave signal receiver being monitored is indicative of the particular frequency step of the search signal then being produced and consequently indicative of the particular transmitting station to which said wave signal receiver is tuned. A continuous record of this response with respect to the beginning of the search cycle provides a continuous record of the stations to which the wave signal receiver is tuned. The present invention is particularly concerned with arrangements for eliminating any undesirable effect from the audibility standpoint of the search tone or response.

Referring now to Fig. 1 of the drawings there is illustrated a wave signal receiver 10 to be monitored by the apparatus of the present invention. This wave signal receiver may be any type of wave signal receiver and need not be the well-known superheterodyne type of receiver which is the only type that can be monitored by some prior art devices. The wave signal receiver 10 is illustrated as comprising an antenna ground circuit 11 and a signal reproducer or loud speaker 12. Associated with the wave signal receiver 10 is a portion of the apparatus which might be referred to as the receiver attachment 13. This receiver attachment is of relatively small bulk which is generally capable of being disposed within the available space in even very small receiver cabinets. The receiver attachment 13 and the receiver 10 are connected to a power supply such as the house wiring circuit 14 in a manner understood by those skilled in the art. The house wiring circuit 14 provides a source of power for the receiver and also provides a channel whereby the receiver response which is converted into a transmittable signal by the receiver attachment 13 can be transmitted to the central station generally designated at 15 preferably located in any suitable place such as the basement or a closet of the home in which the wave signal receiver 10 is located. The central station 15 includes the precision apparatus which may have substantial bulk for recording the station response and also includes the search signal generator to be described hereinafter. A suitable transmitting antenna 16 is shown associated with the central station 15 whereby the search signal is transmitted so as to be picked up by the antenna ground circuit 11 of the wave signal receiver 10. The house wiring circuit 14 is illustrated as comprising a dotted line section to indicate the remote relationship of the receiver 10 and the central station 15.

For the purpose of picking out the search tone or response produced in the receiver 10 by virtue of the receipt of the search signal the receiver attachment 13 is illustrated as connected to a circuit such for example as the audio circuit of the wave signal receiver 10 preferably ahead of any tone or volume control in the receiver by means of a conductor 17. As is disclosed in the above mentioned Scherbatskoy co-pending application, however, such a connection with the receiver 10 is very simple and does not require disturbing the high frequency circuits in the receiver. Furthermore as is also disclosed in the above mentioned Scherbatskoy co-pending application, such a connection with the receiver may be completely dispensed with if desired. It will be apparent that with such an arrangement little or no resistance will be encountered in placing such equipment in a collaborator's home. The receiver attachment 13 is of such small bulk that in many cases it may comprise a volume no greater than that of an ordinary cigarette package and if no attachment whatever is made with the receiver the collaborator will have no fear that the operation of his receiver will be impaired. Furthermore the more bulky apparatus is located in an out-of-the-way place in the home and no connections with this apparatus and the receiver are required other than connections of the individual apparatus to the house wiring circuit which is assumed to be present both where the receiver is located and where the central station is located.

Referring now to Fig. 2a of the drawings it will be noted that the details of the wave signal receiver 10 and the receiver attachment 13 are shown, although the particular construction of the wave signal receiver 10 forms no part of the present invention. For the purpose of making a complete disclosure the wave signal receiver 10 is depicted as of the well-known superheterodyne type although it might equally comprise some other type of receiver. As illustrated the wave signal receiver 10 comprises a power supply unit 20 which is connected to the receiver attachment 13 through a plug connector 21 and a manually actuated switch 22. The primary winding 23 of the power supply transformer is shown connected in series with the manually operable switch 22. It should be understood that the switch 22 is preferably the standard form of switch employed on radio receivers which usually is combined with the volume control. In addition to the power supply unit the wave signal receiver 10 comprises a tunable radio frequency amplifier unit 24, an oscillator modulator unit 25, an intermediate frequency amplifier unit 26, a detector and automatic gain control unit 27, and an audio frequency amplifier unit 28 connected in tandem in the order named. The antenna ground circuit 11 is connected to the input of the tunable radio frequency amplifier 24, while the signal reproducer or loud speaker 12 is connected to the output of the audio frequency amplifier 28. The power supply unit 20 is illustrated as being interconnected with the various stages of the wave signal receiver 10 for supplying the necessary plate voltage as well as filament current. The detector and automatic gain control unit 27 is illustrated as being interconnected with several of the preceding stages by the automatic volume control circuit 29. As illustrated the detector and automatic gain control unit 27 includes a detector tube 30 which has its plate circuit connected through a suitable tuned circuit 30a, a coupling capacitor 31 and a portion of a manually adjustable volume control resistor 32 to the control electrode or grid of an electron discharge valve 33 which may comprise the first audio stage of the wave signal receiver 10. The top of the automatic volume control resistor 32 is designated by the reference numeral 32a. It will be understood that this point 32a is readily available in most wave signal receivers such as 10 without in any way disturbing the electrical circuits therein.

The operation of the wave signal receiver 10 described above will be apparent to those skilled in the art. Briefly, radio frequency signals are selected and amplified by the tunable radio frequency amplifier 24. These selected signals are supplied to the oscillator modulator unit 25 where they are converted to a fixed intermediate frequency which is amplified in the intermediate frequency amplifier unit 26 and subsequently detected in the detector stage 27. These detected modulation signals of audio frequency are amplified by the audio frequency amplifier and reproduced in audible form by the signal reproducer 12.

Before considering the details of the receiver attachment designated as 13 in Fig. 2a of the drawings whose purpose is to convert a suitable response or search tone in the wave signal receiver 10 to a measurable signal which can be transmitted to the recording unit in the central station 15, reference may first be had to Fig. 2b of the drawings wherein is disclosed a portion of the apparatus of the central station 15. Although any type of search signal generator may be employed there is illustrated the so-called "center frequency" search signal generator of the present invention designated generally by the reference numeral 35. This search signal generator 35 is capable of producing during each scanning cycle a search signal the frequency of which varies in a series of discrete frequency steps, the frequency of each step being substantially equal to the transmitting frequency of an associated transmitter likely to be tuned in by the wave signal receiver 10. Any suitable means for producing such a search signal may be employed. As illustrated the search signal generator 35 includes a section 35a comprising an oscillator controlled by a plurality of crystals which are capable of producing the rigorously controlled frequencies desired. Satisfactory crystals for producing frequencies in the frequency modulation band are not available and accordingly the section 35b of the search signal generator 35 is provided for producing during the search signal cycle a plurality of discrete frequencies in the frequency modulation band.

The section 35a of the search signal generator 35 includes an electron discharge valve 37 which is specifically illustrated as a pentode having an anode 38, a cathode 39, a control electrode 40, a suppressor grid 41 and a screen grid 42. For the purpose of producing a variable frequency search signal the frequency of which varies in a stepwise manner, the pentode 37 is operated as a crystal oscillator of the Pierce type with the discrete frequency steps accurately controlled by a plurality of crystals designated as 43a, 43b, 43c, 43d, 43e and 43f which are arranged to be successively connected, once during each scanning cycle, into the oscillator circuit including the electron discharge valve 37. As mentioned above each of the crystals 43a, 43b, 43c, 43d, 43e, and 43f is chosen to have a frequency which coincides with the frequency of a different one of the transmitting stations within the standard broadcast band likely to be tuned in by the wave signal receiver 10. It will be understood that for different localities different crystals will be chosen. Preferably the crystal 43a has the lowest natural frequency somewhere within the range of 550 to 1600 kc. and the others are of progressively higher frequencies within the same range. Although only six such crystals are illustrated it should be understood that any desired number might be employed depending upon the number of transmitters to which the wave signal receiver 10 is likely to be tuned. The six crystals are illustrated by way of example only and the specific number chosen is unimportant as far as the present invention is concerned.

For the purpose of selectively connecting one crystal at a time into the oscillator circuit each crystal has one terminal thereof connected to the screen grid 42 of the electron discharge valve 47. The other terminals of the crystals 43a, 43b, 43c, 43d, 43e and 43f are each connected to a different one of a plurality of contacts 44a, 44b, 44c, 44d, 44e and 44f respectively which are arranged together with a plurality of contacts 44g, 44h, 44i and 44j along the periphery of a circle in equally spaced relationship so as to form with a rotating switch arm 45 a rotating switch mechanism. As will be brought out in greater detail hereinafter the rotating switch arm 45 is preferably adapted to be driven at a constant angular speed preferably at one revolution per minute so that the terminals or contacts 44a to 44j are successively engaged at equally spaced time intervals. The terminals 44g, 44h, 44i and 44j have no function whatever and could be omitted so long as the space and arrangement of the other terminals remain unchanged. It should furthermore be understood that if the section 35b of search signal generator 35 were not employed that the terminals 44a to 44f would preferably be arranged around the circumference of a circle at equally spaced intervals. Such an arrangement is shown in the above-mentioned co-pending Richards application. However, the terminals 44g, 44h, and 44i correspond to intervals when search signals are produced by the section 35b of the search signal generator 35 and at those times and also at the time corresponding to the terminal 44j the section 35a of the search signal generator 35 is inactive.

In order that the crystals 43a to 43f are connected to control accurately the stepwise varying frequency of the search signal the movable switch arm 45 is connected by means of a conductor 46 to the control electrode 40 of electron discharge valve 37. The cathode 39 of the pentode 37 is preferably grounded as indicated at 48 and a suitable feed back capacitor 49 and a grid leak resistor 50 are provided. The screen grid 42 is furthermore connected to a conductor 51 through a voltage dropping resistor 52. The conductor 51 as will be described hereinafter is connected to a suitable source of +B potential. Suitable radio frequency bypass capacitors 53 and 54 are also provided. With this arrangement it is apparent that the crystals oscillate in the mode of the Pierce circuit.

In order that the search signal, varying in frequency in a stepwise fashion, appearing in the plate circuit of the pentode 37 is supplied to the transmitting antenna 16 so that it can be transmitted to the wave signal receiver 10 for interception by the antenna ground circuit 11, the plate circuit of the electron discharge valve 37 is connected to a source of +B potential such as the conductor 51 through a conductor 55, a plurality of parallel connected networks, and a rotatable antenna attenuator switch comprising the movable switch arm 56 and a plurality of contacts 57a, 57b, 57c, 57d, 57e, 57f, 57g, 57h, 57i, and 57j arranged in equally spaced relationship along the periphery of a circle. As illustrated the contacts 57a to 57j inclusive are positioned in exactly the same manner as the contacts 44a to 44j and the contacts marked with the corresponding letter are simultaneously engaged by the associated rotatable arms 56 and 45 respectively. Each of the parallel connected networks comprises a resistor 58 specifically designated as 58a, 58b, 58c, 58d, 58e and 58f respectively for the different networks and a capacitator 59 specifically designated as 59a, 59b, 59c, 59d, 59e, and 59f respectively for the various networks. Each capacitor 59 is adapted to parallel a variable portion of its associated resistor 58. The resistors 58 are provided to insure that the direct current plate voltage remains constant at all times so as not to cause variations in the output frequency of the oscillator. However, for the purpose of producing the desired attenuation of the alternating current signals of discrete frequencies produced by virtue of the plurality of crystals 43a to 43f, the variable impedance paths through the capacitators 59 and the variable portions of the resistors 58 are provided. With this arrangement a uniform intensity of the search signal throughout the scanning cycle is obtained. The contacts 57g, 57h and 57i of the antenna attenuator switch are connected to the plate circuits of the oscillators of the section 35b of the search signal generator 35 so that +B plate potential may be applied thereto through the rotatable switch arm 56, and the conductor 55 at different predetermined instants during the search signal scanning cycle. The antenna 16 is coupled to the plate circuit of the pentode 37 by means of a suitable coupling capacitor 60.

In order to produce a search signal which comprises a plurality of discrete frequencies varying in a stepwise manner, each discrete frequency step occurring once during each search or scanning cycle and at exactly the same position during each cycle, there is provided a synchronous motor and gear train unit 61, which is adapted to be connected with the house wiring circuit 14 through suitable control circuits to be described hereinafter, including the conductors 62 and 63. Preferably the synchronous motor is adapted to rotate the switch arms 45 and 56 by means of an interconnecting shaft generally designated at 61' at one revolution per minute.

The shaft 61' of the synchronous motor unit 61 is also adapted to rotate a third switch arm 64 which with the contacts 65a, 65b, 65c, 65d, 65e, 65f, 65g, 65h, 65i, and 65j provides a stylus selecting switch with reference to a plurality of styli 67 forming a part of a recorder unit 68. As illustrated the terminals or contacts 65a to 65i inclusive of the stylus selecting switch are adapted to be connected by suitable conductors extending in a cable 66 to the individual styli 67a, 67b, 67c, 67d, 67e, 67f, 67g, 67h and 67i respectively of a recorder 68 to be described hereinafter in greater detail. The switch arms 45, 56 and 64 are all disposed in the same angular position with reference to shaft 61' so that the associated contacts marked with the same subscript are simultaneously contacted by all three switch arms 45, 56 and 64. Accordingly, the contacts or terminals 65a, 65b, 65c, 65d, 65e, 65f, 65g, 65h, 65i and 65j are also arranged along the periphery of a circle in exactly the same manner and order as the contacts or terminals 44 and 57. The synchronous motor 61 is preferably of a type which is capable of starting and stopping substantially instantaneously, the reason for which will become apparent from the following description.

Although the wave signal receiver 10 has been illustrated as one for receiving the standard broadcast band, it will be understood that it might equally well be a frequency modulation receiver or at least be provided with a frequency modulation channel. In order that information with respect to the tuning of a wave signal receiver to stations transmitting frequency modulated signals may be recorded, the frequency spectrum of the frequency modulation band must also be scanned by the search signal generator 35. As was mentioned above crystals capable of producing oscillations in the frequency modulation band are not generally available. If they were the search signal generator 35 would merely be provided with additional crystals each having a natural frequency corresponding to the transmitting frequencies of different frequency modulation stations to which the wave signal receiver being monitored is likely to be tuned. As was brought out above by having the search signal frequency during each scanning cycle composed of a plurality of discrete frequency steps, the frequency of each step being equal to the transmitting frequencies of a plurality of different transmitting stations to which the wave signal receiver might be tuned, no audible variable pitch heterodyne note can be produced, since to produce an audible variable pitch heterodyne note it is necessary to have two intermodulated frequencies which produce a variable frequency beat frequency in the audible range. Furthermore when the frequencies of the intermodulated signals are almost exactly equal the beat frequency is obviously inaudible.

As illustrated in the drawings the section 35b of the search signal generator 35 is capable of producing a search signal whose frequency varies in a step-wise fashion, in three discrete frequency steps during each cycle of the search signal which steps are a continuation of the discrete frequency steps produced by section 35a of the search signal generator 35. In other words, the search signal generator 35 produces a search signal having nine discrete frequency steps, six of which are within the standard broadcast band produced by the section 35a and three of which are in the frequency modulation band produced by section 35b.

As illustrated in Fig. 2b of the drawings, the section 35b of the search signal generator 35 includes three very high frequency oscillators hereinafter designated as VHF oscillators 70 and specifically designated by the reference numerals 70g, 70h and 70i to correspond with the contacts 57g, 57h, and 57i respectively, to which the plate circuits of the VHF oscillators 70 are respectively connected. The details of the VHF oscillators 70 form no part of the present invention and are shown in block diagram in Fig. 2b of the drawings. However, for the purpose of a complete disclosure, one type of VHF oscillator which was satisfactorily employed is illustrated in Fig. 3 of the drawings and is substantially identical with the VHF oscillator described as a tuned circuit oscillator for the very high frequency range at pages 372 and 373 of the 1946 edition of the Radio Amateur's Handbook.

The VHF oscillator 70i which is identical with the oscillators 70h and 70g is shown in unconventional fashion in Fig. 3 of the drawings to show how the tube elements are tied in with circuit construction. The corresponding parts are designated by the same reference numerals as in the preceding figure. Basically, the oscillator comprises two heavy brass plates 71a and 71b which act both as tube mounting supports and as the stator plates of the tuning condensers 72 and 73 respectively. For the purpose of reducing the circuit inductance and electron discharge valve of the 6F4 type which has symmetrically arranged grid and plate leads is employed, designated as 74 in the drawings. This tube or valve 74 comprises an anode 75 supported by the brass plate 71a, a cathode 76, a control electrode or grid 77 supported by the plate 71b, and a filament 78. The inductance is furthermore kept low by shunting the lead wires to the tube 74 by the low inductance brass plates 71a and 71b. A pair of small inductance coils 79a and 79b which represent most of the inductance of the circuit are connected to the brass plate 71a. By properly choosing these coils and properly adjusting the capacitors 72 and 73 the desired oscillator frequency may be obtained. Plate potential or +B potential is supplied to a tap 83 on one of the inductances such as 79a through a suitable voltage dropping resistor 80 from an associated contact such as 57i of the rotary switch including the switch arm 56. With this arrangement it is apparent that +B potential from the conductor 51 is applied successively to the oscillators 70g, 70h and 70i in that order at the instants the associated terminals 57g, 57h and 57i respectively are contacted by the rotating switch arm 56. The leads interconnecting the taps 57g, 57h and 57i with the plate circuits of the oscillators 70g, 70h and 70i respectively are designated by the reference numerals 81g, 81h and 81i respectively. In order to supply the oscillations to a transmitting antenna which may be the antenna 16, but preferably is a separate antenna such as 82, one of the windings such as 79a is inductively coupled to a winding 83i in the circuit of the antenna 82. The plate circuits of the oscillators 70g and 70h are also inductively coupled to the antenna 82 through windings 83g, and 83h respectively connected in series with the winding 83i as is clearly shown in Fig. 2b of the drawings.

For the purpose of controlling the oscillations of the VHF oscillators 70 a variable resistance is connected in series with each of the cathodes 76. As illustrated in Fig. 2b of the drawings variable resistors in the form of electron discharge valves 84g, 84h and 84i respectively are connected in series with the cathodes 76 of each of the associated VHF oscillators 70g, 70h and 70i respectively. As illustrated, each of the electron discharge valves 84 is a twin triode comprising a pair of anodes 85, a grounded cathode 86 and a control electrode or grid 87. The plate circuits of each valve are connected in parallel to produce a low internal tube resistance. The oscillator circuits are so adjusted that when zero or a positive voltage is applied to the control electrodes 87 which are all connected in parallel through suitable parallel arranged resistors 88, the oscillators will produce oscillations when supplied with plate potential.

From the detailed description included above it is apparent that the search signal generator 35 produces a search signal which scans both the amplitude modulation and the frequency modulation frequency spectrum in a series of discrete frequency steps each step having a frequency equal to that of various amplitude modulation and frequency modulation transmitters which are likely to be tuned in by the wave signal receiver being metered or monitored.

For the purpose of producing a recordable index signal of the tuning condition of the wave signal receiver 10 the spectral composition of the search signal produced by the search signal generator 35 should be such that it is capable of producing a response in a frequency selective circuit such as the wave signal receiver 10. As was discussed in the above-mentioned co-pending Scherbatskoy application, a very satisfactory search signal is one which includes a modulation component of a single component or monochromatic frequency which can be filtered by a narrow band pass filter and which furthermore is of such a frequency as to be outside the range of maximum sensitivity of both the wave signal receiver 10 and the human ear. A satisfactory monochromatic signal has been found to exist in the frequency range of 5,000 to 6,000 cycles. A response of this frequency produced in the receiver 10 is within the pass band of the receiver and such a response or search tone will be produced in the receiver whenever the frequency of the search signal produced by the search signal generator 35 is equal to the frequency of the station carrier tuned in by the wave signal receiver 10. Accordingly there is provided at the central station 15 a generator capable of generating a 5 kc. signal which is illustrated in Fig. 2b of the drawings as a 5 kc. oscillator 89 which is adapted to supply a modulation component to both sections 35a and 35b of the search signal generator 35.

It should be understood that the 5 kc. oscillator may comprise any standard form of oscillator capable of producing a monochromatic signal and the 5 kc. frequency is furthermore not essential since other frequencies might be employed such as 6 kc. for example. As illustrated oscillator 89 comprises an electron discharge valve 90 having an anode 91, a cathode 92, a control electrode 93 and a screen grid 94. A tank circuit 95 has one end thereof coupled to the control electrode 93 by means of a capacitor 96. This control electrode 93 is also connected to ground through a suitable grid leak resistor 97. For feed back purposes the cathode 92 is connected to a suitable tap 98 on the inductance of the tank circuit 95. The tank circuit 95 is also coupled to the plate circuit of the electron discharge valve 90 by means of a capacitor 99 and a resistor 100. The screen grid 94 is connected to a source of +B potential through a suitable conductor 101 and a voltage dropping resistor 102. The plate 91 is also connected to the conductor 101 through the resistor 102 and a winding 103. The winding 103 forms a part of a coupling means 104 for coupling the output of the oscillator 89 to the control electrodes 87 of the variable resistor tubes 85. Any other coupling means might be employed however. The 5 kc. output from the oscillator 89 therefore changes the conductivity of the tubes 85 and consequently the internal resistances thereof. When the internal resistance is decreased sufficiently the resonant circuits of the oscillators 70 are damped sufficiently to stop oscillations. Consequently the search signal produced by the section 35b of the search signal generator 35 in addition to varying in frequency in a stepwise manner is also pulsed or amplitude modulated at a frequency of 5 kc.

To cause the search signal produced by the section 35a of the search signal generator 35 to include a 5 kc. modulation component capable of producing a response in the wave signal receiver 10, the plate circuit of the 5 kc. oscillator 89 is also coupled to the suppressor grid 41 of the pentode 37 through a suitable coupling capacitor 107 and a resistor 108, which resistor 108 permits an initial adjustment to be made. The suppressor grid 41 is also grounded through a suitable resistor 109. Consequently the output of the search signal generator 35 comprises a search signal composed of a succession of discrete frequencies occurring in a stepwise fashion all amplitude modulated with a 5 kc. modulation component.

It will be understood that if no frequency-modulation channel is embodied in the wave signal receiver 10 that the section 35b of the search signal generator 35 may be omitted. It will be understood that any other type of search signal generator may also be employed so long as it is capable of producing during a scanning or search cycle a discontinuously variable frequency signal in the form of discrete frequency steps, each step of which substantially equals the frequency of a transmitting station likely to be tuned in by the wave signal receiver being monitored.

It will be apparent that operation of the receiver attachment 13, the details of which are described hereinafter, as well as operation of the central station 15 require a source of power both for the filaments of the tubes involved as well as for the plate potentials and the various bias potentials. It is furthermore desirable that such power be supplied only when it is desirable to monitor the receiver 10 and record information relative to the station or stations to which a receiver is tuned or in other words only when the receiver 10 is turned on. Obviously then the power supply for the receiver attachment 13 and the central station 15, should not be rendered effective to supply the necessary electrical energy unless the receiver 10 is turned on.

The power supply unit for the receiver attachment is specifically designated in Fig. 2a of the drawings by the reference numeral 110. Preferably the power supply unit 110 is connected through the contacts 111a of a relay 111 and the plus connector 21a to the house wiring circuit 14. The winding of the relay 111 is connected in series with the receiver power supply through the manually actuable switch 22 of the receiver 10 and the plug contact 21. Whenever the receiver 10 is turned on through closing of the switch 22 current flows to the receiver power supply unit 20 which is of sufficient magnitude to pick up relay 111 and close the contacts 111a with the result that the power supply unit 110 is energized. This power supply unit includes an auto-transformer 112 to which is coupled a winding 113 for supplying the filaments of the electron discharge valves employed in the receiver attachment 13. The portion 112a of the auto-transformer 112 is connected through the contacts 111a across the house wiring circuit 14 through the connector or plug contact 21a. The complete transformer winding on the other hand is connected in series with the rectifiers 114 and 115 and a suitable resistor 116 with the plate circuits of the electron discharge valves in the receiver attachment 13 so as to supply the necessary +B potential. A suitable filter capacitor 117 is connected across the output terminals of the +B source of potential for smoothing purposes. The other terminal of the power source 110 is grounded as indicated at 118.

As has been mentioned in connection with Fig. 1 of the drawings the only electrical circuit interconnecting the central station 15 and the wave signal receiver 10 is the house wiring circuit 14. This is also true of the receiver attachment 13 and the central station 15. It will be understood that the house wiring circuit 14 could be employed as a remote control circuit for energizing a power supply unit designated at 120 and located at the central station 15 in response to turning on the wave signal receiver 10 as by closing the switch 22. To this end there is provided in the receiver attachment 13 an oscillator 121 which is capable of producing a distinctive oscillation preferably above the audible range whenever the switch 22 is closed. As illustrated the oscillator 121 is designated as a 9 kc. oscillator. Any conventional type of oscillator may be employed for this purpose and as shown in the drawings this oscillator comprises an electron discharge valve 122 having a cathode 123, an anode 124 and a control electrode 125. The tank circuit for the oscillator comprises an inductance 126 and a capacitance 127. The tank circuit is magnetically coupled as by the winding 128 and the coupling capacitor 129 with the control electrode or grid 125 and the oscillator tube 122. The control electrode 122 is connected to the cathode 123 through a grid leak resistor 130 grounded as indicated. A source of plate potential from the output of the power supply unit 110 is connected to the anode 124 through the inductance 126 and a conductor 131. The plate or output circuit of the 9 kc. oscillator 121 is connected through a conductor 132 to the ungrounded side of the house wiring circuit 14 whereby the 9 kc. oscillations are transmitted along the house wiring circuit 14. It will be apparent that these 9 kc. oscillations superimposed on the 60-cycle 110-volt house wiring circuit will cause no interference with the wave signal receiver 10 since the frequency is above the audible range of both the signal reproducer 12 and the human ear.

The power supply unit 120 at the central station 15 comprises a power supply transformer 135, the primary winding 135a of which is connected across the house wiring circuit 14 through a suitable plug connector generally indicated at 134 and the contacts 137a of a relay 137 forming a part of a remote control unit 136. The remote control unit 136 includes means for closing the normally open contacts 137a of the relay 137 in response to the closing of the wave signal receiver switch 22 which causes a 9 kc. signal as described above to be supplied to the remote control unit 136. As illustrated the remote control unit 136 includes a gas triode 138, the plate circuit of which is connected in series with the winding of the relay 137. This gas triode 138 includes an anode 139, an ionic cathode 140 and a grid or starter anode 141. Such a gas triode 138 may be of the type designated as OA4. In such a gas triode a relatively small amount of the electrical energy supplied to the starter anode 141 initiates a glow discharge between the cathode 140 and the starter anode 141 so as to start the main discharge between the plate 139 and the cathode 140 with the resultant energization of the relay 137 to close its contacts 137a. As illustrated the starter anode 141 is connected between two bleeder resistors 142 and 143 arranged in series across the house wiring circuit 14. With this arrangement the starter anode 141 is normally maintained at a potential which is below that required for breakdown. A tuned circuit comprising the inductance 144 and the capacitor 145 are also connected across the power line or house wiring circuit 14 in parallel with the bleeder resistors 142 and 143. The terminal of the capacitor 145 connected to the inductance 144 is connected to the cathode 140. This tuned circuit is made resonant at 9 kc., so that when the 9 kc. oscillations produced by the 9 kc. oscillator 121 are received at the remote control unit 136 a resonant voltage appears across each component of the tuned circuit comprising the inductance 144 and the capacitor 145. The effect of this voltage across the capacitor 145 is to increase the negative potential peaks on the cathode 140 and thus effectively to increase the potentials between the cathode 140 and the starter anode 141. Consequently these voltage peaks start a discharge between the cathode 140 and starter anode 141 so as to start the main discharge between the anode 139 and the cathode 140. Because alternating current is supplied to the anode 139 the gas triode 138 ceases to discharge when the 9 kc. oscillations are removed. Consequently the remote control unit 136 is capable of energizing and deenergizing the primary winding 135a of the power supply transformer 135 in response to the closing of the receiver switch 22 without any connection between the two circuits except the conventional power line.

The power supply unit 120 also includes a rectifier 150 whose anodes 151 and 152 are connected to the end terminals of the secondary winding 135b of the transformer 135 in the manner of a full-wave rectifier. The filament current for the electron discharge valves in the central station 15 including the rectifier 150 may be obtained from a suitable secondary winding 135c of the power transformer 135. The center terminal 153 of the transformer secondary winding 135b is grounded as indicated at 154 and provides the negative or ground terminal of the B potential source. The cathode 155 of the rectifier 150 is connected through a suitable smoothing filter 156 to the terminal 157 which is the +B terminal of the plate or B potential source. For the purpose of providing a regulated plate potential, a series circuit comprising an adjustable resistor 158 and a pair of voltage regulator tubes 159 and 160 are connected across the terminals 154 and 157. Also a capacitor 161 is connected across the series connected voltage regulator tubes 159 and 160. The highly regulated +B potential appearing at the plate of the voltage regulator 159 is connected by means of a conductor 162 to control circuits described hereinafter. Another regulated source of +B potential appearing at the plate of the voltage regulator tube 160 is supplied to the conductor 101 which is connected to the 5 kc. oscillator 89 as described above. The voltage regulator tubes 159 and 160 are preferably the conventional gaseous regulator tubes and the resistor 158 is in effect a current limiting resistor connected in series with the gaseous voltage regulator tubes for producing satisfactory operation thereof.

The power supply unit 120 also supplies to a voltage divider unit 163 a suitable biasing potential. As illustrated a diode 164 has its cathode connected to one terminal of the secondary winding 135b of the transformer 135. The plate of the diode 164 is connected through an adjustable resistance 165 and a smoothing and voltage regulating unit 166 to the ground terminal 154. A negative biasing potential appearing at the terminal 167 is supplied to the voltage divider unit 163 by means of a conductor 168. It should be noted that the conductor 62 from the synchronous motor 61 is connected to the grounded side of the house wiring circuit as indicated at 169. This side of the house wiring circuit is preferably grounded through a suitable capacitor 170, as far as the high frequencies transmitted thereover are concerned without however grounding the line as far as the 60-cycle power is concerned.

For the purpose of picking up a signal indicative of the response produced in the wave signal receiver 10 by the search signal created by the search signal generator 35 there is provided in the receiver attachment 13 a tuned amplifier unit generally designated at 175 which tuned amplifier unit is equivalent to a band pass filter and an amplifier. The details of the tuned amplifier unit 175 are unimportant as far as the present invention is concerned. This tuned amplifier is sharply tuned to a frequency of 5 kc., which is the frequency of the search tone produced in the receiver 10 as described above. To limit the frequencies picked up by the tuned amplifier 175 to a very narrow frequency band, it is provided with three cascaded tuned circuits comprising the tuned circuits 176, 177 and 178. The tuned amplifier 175 further includes a plurality of electron discharge valves 179, 180, and 181 for amplifying the 5 kc. signal supplied to the tuned amplifier 175. The plate circuits of these electron discharge valves are connected to the conductor 131 mentioned above which is connected to the source of plate potential at the power supply unit 110.

In order that the response produced in the wave signal receiver 10 may be received by the tuned amplifier 175, the input thereof may be coupled through a coupling capacitor 182 to a microphone or the like positioned adjacent the signal reproducer 12 of the wave signal receiver 10, or, as illustrated, may be connected to the terminal 32a at the top of the volume control of the wave signal receiver 10. Preferably the capacitor 182 is very small. Such a connection can readily be made without disturbing the high frequency circuits or even the audio circuits of the receiver 10. The alternative arrangement suggested above employing a microphone is shown in the co-pending Scherbatskoy application referred to above and no connection whatever with the receiver is required in such case.

As illustrated in the drawings the output of the tuned amplifier 175 is connected by means of a coupling capacitor 183, which resonates with inductance to form one tuned circuit of the tuned circuit 178 and the conductor 132 with the house wiring circuit 14 so that the response in the form of a 5 kc. signal may be supplied to the central station 15 to be recorded by the recorder 68.

In order that a record of the search tone produced in the receiver 10 may be made by the recorder 68, the central station 15 is provided with a 5 kc. control channel comprising a 5 kc. band pass filter 184 and a 5 kc. amplifier and relay unit 185. The 5 kc. band pass filter 184 is connected through a coupling capacitor 166 and a conductor 187 to the ungrounded side of the house wiring circuit 14 through the contacts 137a of the relay 137. The capacitor 186 prevents 60-cycle current from entering the 5 kc. channel while still providing a path for the 5 kc. current. The 5 kc. filter 184 is a very sensitive filter illustrated as a 2-mesh filter. It is apparent therefore that very high selectivity of the 5 kc. search tone frequency is obtained since the tuned amplifier 175 in the receiver attachment is provided with three tuned circuits, each circuit tuned to 5 kc., and the band pass filter 184, is provided with a two-mesh tuned circuit. The band pass filter 184 also includes a built in attenuator comprising the resistor 188.

In order that the single frequency component or monochromatic signal passed by the band pass filter 184 may be caused to produce a record of the response in the recorder unit 68, to be described hereinafter, the output of the band pass filter 184 is preferably supplied in succession to a 5 kc. amplifier 189a, a rectifier 190a, and a direct current amplifier 191a which is adapted to control the energization of a stylus control relay 193 all forming a part of the 5 kc. amplifier and relay unit 185. As illustrated the 5 kc. amplifier 189a comprises a section of a twin triode 189 while the rectifier 190a comprises a section of the twin diode 190. Also the direct current amplifier 191a comprises a section of the twin triode 191. The other sections of the twin tubes 189, 190 and 191 will be described in connection with the functions which they perform described hereinafter. It will be understood that separate tubes may be employed rather than the twin tubes illustrated. The control electrode of the 5 kc. amplifier 189a is connected to a suitable voltage divider disposed at the output of the band pass filter 184. The plate circuit of the amplifier 189a is coupled to the rectifier 190a through a suitable coupling capacitor 194. The cathode of the rectifier 190a is connected through a resistor 195 with the control electrode of the direct current amplifier 191a. In order to prevent operation of the 5 kc. amplifier and relay unit 185 unless a 5 kc. signal representative of the search tone or response in the receiver 10 is applied thereto negative bias potential from the voltage divider unit 163 is supplied to the control electrode of the direct current amplifier 191a through a resistor 197. A suitable capacitor 199 connected across the resistor 197 cooperates with the resistor 195 so as to provide a circuit with a long time constant to prevent any signal such as static or an occasional click from causing inadvertent operation of the 5 kc. amplifier and relay unit 185. This arrangement insures operation of the stylus control relay 193 only in response to the existence of a true search tone produced by virtue of the operation of the search signal generator 35.

Plate potential is supplied to the amplifier 189a from the conductor 162 which is a source of +B potential through a coupling resistor 200. The plate circuit of the direct current amplifier 191a is also connected to the conductor 162 which is a source of +B potential through the normally closed contacts 202a, the winding 193' of the relay 193 and the milliammeter 204. The contacts 202a of a relay 202 are illustrated as forming a part of an additional control device to be described hereinafter, but it should be understood that the search signal type device described thus far will function without this relay. If this relay is omitted suitable means for bridging the circuit at the contacts 202a would be provided. The magnitude of the bias potential applied from the unit 163 to the control electrode of the D.-C. amplifier 191a is adjusted so that a low current of for example one milliampere flows through the milliammeter 204 and the winding 193' of the associated relay 193 when no 5 kc. signal is received by the 5 kc. amplifier and relay unit 185 which is insufficient to cause operation of the relay 193. When a response or search tone is produced in the wave signal receiver 10, however, a 5 kc. signal is transmitted through the 5 kc. channel in the central station 15 which is rectified by the rectifier 190a and supplied to the control electrode of the direct current amplifier 191a to cause a substantially larger current as for example a current of 15 milliamperes to flow through the winding 193' of the stylus control relay 193 whereupon this relay is energized to close its normally open contacts 193a.

It will be apparent from the above description that the amplifier 189a, the rectifier 190a, the direct current amplifier 191a and the relay 193 comprise a 5 kc. relay unit 185 which performs a control function whenever a signal responsive to the search tone produced in the wave signal receiver is applied to the control electrode of the amplifier 189a. This unit 185 is adapted to control the operation of the styli 67 of the recorder 68. As illustrated the closing of the contacts 193a supplies +B potential from the conductor 162 to the switch arm 64 of the stylus control switch through a voltage dropping resistor 206 and the conductor 207.

In describing the search signal generator 35 and the synchronous motor 61 no complete description was included as to the circuits for supplying alternating current to the synchronous motor 61 and +B potential to the search signal generator 35. As illustrated in the drawings, the synchronous motor 61 is connected to the house wiring circuit 14 through conductor 62 which leads directly to one side of the house wiring circuit and the conductor 63 which is connected to the other side of the house wiring circuit through the pole 208a of a 3-pole manually actuable control switch 208, the conductor 209, the conductor 187 and the contacts 137a of the relay 137 of the remote control unit 136. As long as the pole 208a of the manual switch 208 is in the solid line position indicated in the drawings, the synchronous motor 61 is continuously energized whenever the switch 22 of the wave signal receiver 10 is closed. Such operation of the search signal generator is generally referred to as "continuous scanning operation" and the solid line position of the 3-pole switch 208 may be referred to as the "continuous scanning position." A suitable capacitor 210 is indicated as arranged in parallel with the switch pole 208a to eliminate arcing when the circuit to the synchronous motor 61 is interrupted. The manually actuable control switch 208 also includes a switch pole 208b and a switch pole 208c. In the "continuous scanning position" of the switch 208 the pole 208c performs no function. However, the pole 208b completes the circuit from the source of +B potential such as from the conductor 162 through the contacts 202a and the switch pole 208b to the search signal generator 35 and specifically to the conductors 55 and 51 through the conductor 211, the conductor 212 and the voltage dropping resistor 213. The pole 208b also supplies +B potential through the conductor 211 and a voltage dropping resistor 214 to a stylus 67j of the recorder 68 to be described hereinafter.

For the purpose of producing an appropriate record indicative of the tuning condition of the receiver 10 there is provided the recorder 68 referred to above and indicated as comprising ten styli 67a to 67j inclusive. It will be understood that the type of recorder employed is immaterial as far as the present invention is concerned and the particular recorder shown in the drawings is chosen by way of example only. As illustrated the recorder 68 includes a movable recording element 215, continuous movement of which in the direction of the arrow is caused by rotation of a sprocket 216. The recording element is specifically illustrated as a tape having perforations along the edges for engagement with the teeth on the sprocket 216. Preferably the sprocket 216 is driven by a synchronous motor 217 connected to a suitable source of power 218 so as to be driven continuously regardless of whether the other elements in the central station 15 are energized or not. Consequently the synchronous motor 217 should not be energized from the power supply unit 120 unless it is connected to the circuit ahead of the contacts 137a of the relay 137. The recorder 68 further includes a suitable take up spool 219 and a tape supply spool not shown. As illustrated the recording element or tape 215 is a chemically responsive element such for example as an electrolytic paper. When an electric current is passed through such an element a chemical action occurs which produces a trace thereon at the point of current flow. To this end the recording element or tape 215 passes over a conducting shoe 220 which is grounded as indicated at 221. It will be apparent therefore that whenever a potential such as a +B potential is supplied to any one of the styli 67a to 67j a current flows through the tape 215 and the resultant chemical action causes a trace to be produced on the recording element 215 beneath the contacting portion of the particular stylus 67 which is energized, since this contacting portion is directly over the grounded conducting shoe 220. Due to the positioning of the styli 67 transversely of the tape 215 the transverse position on the tape of the trace produced by the styli is indicative of the station to which the wave signal receiver 10 is tuned.

In view of the fact that the styli 67a and 67i are connected to various terminals of the stylus selecting switch comprising the rotatable arm 64, it will be apparent that a trace will be produced on the recording element 215 by whichever stylus is energized, when a search tone occurs in the receiver 10 during the scanning cycle of the search signal generator with the resultant energization of the stylus control relay 193 to close its contacts 193a. It will furthermore be apparent that each of the styli 67a to 67i corresponds to a particular frequency step in the search signal whose frequency varies in a stepwise fashion during each cycle of the search signal generator and consequently corresponds to a particular pass band to which the wave signal receiver 10 may be tuned. If, for example, the wave signal receiver 10 is tuned to a transmitter having a frequency equal to that of the crystal 43a of the search signal generator 35, then it will be apparent that a search tone will occur in the wave signal receiver 10 whenever the rotatable switch arm 45 engages its contact 44a. This search tone will cause the stylus control relay 193 to close its contacts 193a in a manner described above at the instant the arm 45 engages its contact 44a. At this instant during the search cycle the arm 64 of the stylus selecting switch engages its contact 65a whereupon the stylus 67a is energized to produce a trace on the recording element 215. When the rotating switch arms 45, 56 and 64 leave their associated contacts marked with the subscript a and the wave signal receiver 10 continues to be tuned to the transmitting station having a transmitting frequency corresponding to that of the crystal 43a the search tone in the receiver is discontinued with the resultant deenergization of the relay 193. Furthermore, the stylus selector switch having the rotatable arm 64 causes deenergization of the stylus 67a. During the succeeding cycles of the search signal generator 35 the stylus 67a is again energized and this continues as long as the wave signal receiver 10 remains tuned to the particular pass band having a frequency substantially equal to the frequency of the crystal 43a. Consequently, a trace in the form of a dashed line will be produced by the stylus 67a on the element 215 as long as the synchronous motor 61 is continuously energized and the tuning of the wave signal receiver 10 is unchanged. It will furthermore be apparent that if the wave signal receiver 10 is tuned to any other station corresponding to a frequency step in the cycle of the search signal generator 35, a corresponding stylus 67 of the recorder 68 will be energized to produce a trace in the form of a dotted or dashed line on the recording element 215.

As a practical matter there is a limit to the number of styli 67 likely to be provided in the recorder 68. Generally the number of styli provided would correspond to the stations which are likely to be tuned in often by the wave signal receiver 10. Occasionally, however, the wave signal receiver 10 will be tuned to stations other than those for which a stylus 67 is provided. Information relative to the tuning of the wave signal receiver 10 to stations other than those for which styli 67a to 67i are provided, is often very valuable to the analysis organization obtaining information relative to the listening habits of wave signal receiver users. Accordingly the recording stylus 67j is provided in the recorder 68 which may be referred to as the "all other stations stylus." As is apparent from the above description the all other stations stylus 67j is energized whenever the wave signal receiver 10 is turned on through operation of the switch 22. Consequently when only a trace by the stylus 67j appears on the recording element 215 it indicates that the wave signal receiver 10 is tuned to what may be referred to as "all other stations," namely, those stations for which no specific stylus 67 is provided in the recorder 68. Only when in addition to the trace produced by the stylus 67j some other trace by some other stylus is also produced is the wave signal receiver 10 tuned to a transmitting station specifically provided for in the search signal generator 35. It will be apparent that if only the trace produced by the stylus 67j appears on the recording element 215 for substantial periods of time that an indication is provided that the search signal generator 35 should be provided with means to produce additional or other steps in the search signal whose frequency varies in a stepwise manner.

In view of the detailed description included above the operation of "center frequency" search signal type of device of the present invention will be apparent to those skilled in the art. As long as the wave signal receiver 10 is turned off the central station 15 is deenergized except for the recording element motor 217 which is preferably continuously energized. Upon actuation of the receiver switch 22 the central station 15 is energized through operation of the remote control unit 136 which causes power to be supplied to the driving motor 61 for the search signal generator 35 and associated apparatus. The resultant search signal produced during scanning cycles of preferably one minute duration vary in frequency in a stepwise fashion, each step having a frequency exactly equal to the transmitting frequency of certain chosen pass bands to which the wave signal receiver 10 is likely to be tuned. When the wave signal receiver 10 is tuned to a station having a frequency corresponding to the frequency of one of the discrete frequency steps of the search signal, the 5 kc. modulation component is detected in the wave signal receiver and a 5 kc. search tone is produced in the receiver which is converted to a signal by the receiver attachment 13 which is transmitted to the central station 15. This signal causes operation of the 5 kc. amplifier and relay unit 185 so as to energize the appropriate stylus 67 in the recorder 68. It will be understood that for "continuous scanning operation" the manual switch 208 might be omitted and the contacts associated with the poles 208a and 208b bridged by suitable conductor means. The continuous scanning aspect of the "center frequency" type of search signal device is very similar to that of the search signal device disclosed and claimed in the above mentioned co-pending Scherbatskoy application Serial No. 781,988. By employing the "center frequency principle" no audible heterodyne note occurs and the search signal may be generated with very simple means.

The search tone or response produced in the receiver 10 by virtue of the search signal is inaudible when its intensity is carefully adjusted to the correct value. Such precise adjustment of the intensity of the search tone without automatic volume control means therefore is very difficult to attain. Consequently some audibility may exist which may be undesirable with the search tone continually recurring at one minute intervals. Such an audible search tone however would not be undesirable if it only occurred for a cycle or two while the tuning of the wave signal receiver 10 is changed. As is disclosed and claimed in a co-pending application of Scherbatskoy and Freeman, Serial No. 781,990, filed concurrently with the present application, a lock-out device may be provided whereby the search signal generator is locked out or prevented from operating once a station has been tuned in by the wave signal receiver. Such a lock out arrangement can be applied to all types of devices employing a cyclic frequency scanning device. As illustrated the manual control switch 208 is provided with a second position shown in dotted lines in Fig. 2c of the drawings which second position might be referred to as the lock out position. In this lock out position the switch poles 208a and 208b interrupt the power supply circuits to the synchronous motor 61 and the search signal generator 35 respectively.

With a lock out arrangement it is desirable to deenergize the search signal generator when a response or search tone is produced in the wave signal receiver indicating that the wave signal receiver is tuned to a particular transmitting station. Since the stylus controlled relay 193 operates in response to the existence of a 5 kc. search tone, this stylus control relay may be provided with a dual function of also acting as a lock out relay. Accordingly and as illustrated in the drawings, the relay 193 is provided in addition to the normally open contacts 193a with two sets of normally closed contacts 193b and 193c respectively. The contacts 193b are connected in parallel with the pole 208b of the manual control switch 208. The contacts 193c on the other hand are connected in parallel with the pole 208a of the manual control switch 208. With this arrangement it is apparent that with the switch 208 in the lock out position energization of the relay 193 causes opening of the contacts 193b and 193c so as to deenergize the synchronous motor 61, the search signal generator 35, and the "all other stations" styli 67j, thereby effectively producing a lock out operation as far as the search signal generator 35 is concerned.

It will be understood that without more the relay 193 will be deenergized as soon as the search tone stops and true lockout requires additional means for maintaining the relay 193 in an energized condition, once it has been picked up by the occurence of a search tone in the wave signal receiver 10. To this end the contacts 193a of the relay 193 also control the supply of a potential from the +B source to the plate circuit of the rectifier 190a. This circuit to the plate of the rectifier 190a may be traced from the contacts 193a through the conductor 225, the pole 208c of the manual control switch 208 and the voltage dropping resistor 226. Application of a positive potential to the plate of the valve 190a provides a positive bias which is applied to the grid of the valve 191a, consequently maintaining plate current flow and continued energization of the relay 193 to maintain contacts 193a in the closed position. With this arrangement a true lockout of the search signal generator 35 is provided and an audible search tone in the receiver will not be undesirable since it occurs only at the instant of tuning. The "all other stations" stylus 67j will not produce a continuous trace whenever the receiver 10 is turned on with the above described lockout arrangement as is the case when the continuous scanning connections are completed by the switch 208, but the all other stations stylus 67j will produce a trace only when the wave signal receiver 10 is not tuned to one of the stations specifically provided for in the search signal generator 35 and the receiver 10 is turned on.

With the arrangement described above the search signal generator will remain locked out once it is locked out unless the receiver 10 is turned off each time before a new station is tuned in. This is not the general practice of users of wave signal receivers and as illustrated means for restarting the scanning cycle of the search signal generator when the tuning is changed are provided. It would be possible for example to provide a time controlled switch in the energization circuit of the stylus control and lock out relay 193 to periodically interrupt this circuit, as, for example, once every 10 minutes. Also recycling of the search signal generator following lock out might be controlled in response to any function representative of a change in the tuning of the wave signal receiver 10. It is known, for example, that a change in the tuning of a wave signal receiver causes a change in the automatic volume control voltage which appears in the circuit 29. Consequently this voltage may be employed to control a recycling device for the lock out relay at the central station 15.

The use of the automatic volume control voltage as a means for initiating recycling of the search signal generator 35 has one disadvantage in that it is not readily available at the top of the volume control in some receivers due to the interposition of the capacitor 31, between the diode load resistor and the volume control. By virtue of the coupling capacitor 31 and the volume control resistor 32, a differentiating circuit is provided so that the potential at the terminal 32a is in effect a derivative of the automatic volume control voltage. By using the time integral of this voltage, however, a voltage substantially equivalent to the automatic volume control voltage is obtained. Accordingly the receiver attachment 13 is provided with an integrating device generally designated at 230, which is coupled to the top of the volume control 32 by means of a coupling capacitor 231. This integrating device comprises a resistor 232, one terminal of which is connected to ground through a capacitor 233. The output of the integrating device 230 is therefore substantially equivalent to the automatic volume control voltage especially with reference to changes in the automatic volume control voltage.

For the purpose of causing the change in automatic volume control voltage to produce recycling of the lock out device at the central station 15, means must be provided in the receiver attachment 13 for supplying a distinctive signal to the central station in response to a change in the automatic volume control voltage. Such a change in the automatic volume control voltage will be a low frequency change and accordingly the output of the integrating device 230 is connected to the control electrode of a low frequency amplifier 234a which is illustrated as comprising one part of a twin triode 234. Plate voltage for the amplifier 234a is supplied from a source of +B potential through a conductor 235 and a voltage dropping resistor 236. The amplified voltage at the output of the low frequency amplifier 234a is supplied through a suitable coupling capacitor 237 to a polarized relay 238 comprising a movable switch arm 239 and the contacts 238a and 238b, one disposed at either side of the switch arm 239. If the AVC voltage increases one of the contacts 238a or 238b is engaged by the switch arm 239. If the AVC voltage decreases the other contact is engaged by the switch arm 239. Suitable spring means, not shown, normally bias the switch arm to the intermediate position shown. As illustrated, movement of the switch arm in either direction to engage one or the other of the contacts 238a or 238b which are connected in parallel, causes operation of an oscillator 240 capable of producing a signal differing from any other other signals transmitted to the central station 15. As illustrated, the oscillator 240 is specifically designated as an 8 kc. oscillator and comprises the triode 234b, forming a part of the twin triode 234. Plate potential for the triode 234b is supplied from the conductor 235. The output of the 8 kc. oscillator 240 is coupled to the house wiring circuit 14 through a conductor 242 and the conductor 132. With this arrangement it will be apparent that whenever a change in the automatic volume control voltage occurs a momentary 8 kc. signal is produced by the oscillator 240 and transmitted over the house wiring circuit 14 to the central station 15. As soon as the voltage of the automatic volume control circuit reaches an essentially steady state condition the relay 238 assumes the position shown in Fig. 2a of the drawings so as effectively to stop the operation of the 8 kc. oscillator 240.

In order that the 8 kc. oscillations of the recycling control device may perform a control function at the central station 15, there is provided at the central station 15 an 8 kc. control channel which is substantially identical with the 5 kc. control channel described above. As illustrated this 8 kc. control channel comprises an 8 kc. band pass filter 245 and an 8 kc. amplifier and relay unit 246, very similar to the corresponding units 184 and 185 respectively. As illustrated, the 8 kc. band pass filter 245 is coupled through a suitable coupling capacitor 247 with the conductor 187 which is connected to the ungrounded side of the house wiring circuit 14 through the contacts 137a of the relay 137. The output of the band pass filter 245 is coupled to the 8 kc. amplifier and relay unit 246 through a suitable coupling capacitor 248.

In order that the 8 kc. signal passed by the band pass filter 245 may initiate recycling of the search signal generator 35, it is preferably supplied in succession to an 8 kc. amplifier 189b, a rectifier 190b and a direct current amplifier 191b which direct current amplifier is adapted to control the energization of the winding 202' of the recycling control relay 202. The amplifiers 189b and 191b and the rectifier 190b are illustrated as forming a part of the twin tubes 189, 191 and 190 respectively, the other sections of which are employed as described above in the 5 kc. amplifier and relay unit 185. The output of the 8 kc. band pass filter 245 is connected to the control electrode of the amplifier 189b. The plate circuit of the amplifier 189b is coupled to the rectifier 190b through a suitable coupling capacitor 249. The cathode of the rectifier 190b is connected through a resistor 250 with the control electrode of the direct current amplifier 191b. In order to prevent operation of the 8 kc. amplifier and relay unit 246 unless an 8 kc. signal produced by the oscillator 240 is received, a negative bias potential from the voltage divider 163 is supplied to the control electrode of the direct current amplifier 191b through a resistor 251, and to the plate of the rectifier 190b through a resistor 252. A suitable capacitor 253 connected across the resistor 251 cooperates with the resistor 250 so as to provide a circuit with a long time constant to prevent any signal such as static or an occasional click from causing inadvertent operation of the 8 kc. amplifier and relay unit 246.

Plate potential is supplied to the amplifier 189b from the conductor 162 which is a source of +B potential through a resistor 255. The plate circuit of the direct current amplifier 191b on the other hand is connected to the conductor 162 which is a source of +B potential through the winding 202' of the relay 202 and the milliammeter 256. The magnitude of the bias potential applied from the unit 163 to the control electrode of the direct current amplifier 191b is adjusted so that a low current for example of one milliampere flows through the milliammeter 256 and the winding 202' when no 8 kc. signal is received, which current is insufficient to cause operation of the relay 202. Upon the receipt of an 8 kc. signal, however, the direct current amplifier 191b is rendered much more conductive and a sufficiently higher current flows through the winding 202' causing the relay 202 to open its normally closed contacts 202a. Since the contacts 202a control the supply of +B potential to the winding 193' of the stylus control and lock out relay 193, energization of the recycling relay 202 causes deenergization of the lock out and stylus control relay 193. With this arrangement it is apparent that recycling of the search signal generator 35 through deenergization of the relay 193 is caused whenever the tuning of the wave signal receiver 10 is changed.

It will be apparent that any type of system employing a lock out arrangement responsive to the receipt of a particular type of signal can lock out in response to an incorrect signal. For the purpose of minimizing the possibility of locking out the search signal generator 35 in response to an incorrect signal, the recycling control channel is made more sensitive than the 5 kc. channel in the central station 15. This is true of the arrangement described above by virtue of the built in attenuator comprising the resistor 188 in the 5 kc. band pass filter 184, which is not present in the 8 kc. band pass filter 245. Consequently a sudden burst of static or a sudden very intense noise on the house wiring circuit 14 cannot cause incorrect logging of the tuning condition of the wave signal receiver 10 since it will also cause recycling. Consequently anything which causes false logging also causes immediate recycling.

If the search tone in the wave signal receiver should be too strong, as, for example, during daytime reception of a distant station which is normally received at night, such a strong search tone could cause slight operation of the automatic volume control circuit in the wave signal receiver 10, with the resultant recycling of the search signal generator 35. To avoid such undesirable recycling at the instant of logging the tuning condition of the wave signal receiver 10, means are provided to desensitize the recycling circuit at the instant of the production of the search tone. This is accomplished, as illustrated in the drawings, by employing the surge voltage produced in the plate circuit of the direct current amplifier 191a in response to the sudden increase in current causing energization of the relay 193 to desensitize the 8 kc. amplifier 189b. To this end the plate circuit of the direct current amplifier 191a is paralleled with a circuit comprising the capacitor 260 and the resistor 261. The negative pulse of voltage produced across the condenser 260 upon energization of the relay 193 appears at the ungrounded terminal of the resistor 261 designated at 262 and is supplied to the control electrode of the 8 kc. amplifier 189b through a voltage dropping resistor 263. It will be apparent that a voltage impulse will also be produced when the relay 193 is deenergized, but since the impulse is in the reverse direction it will not desensitize the recycling control circuit. In order to remove the charge on the condenser 260 so as not to desensitize the control circuit at any time except when a response occurs in the wave signal receiver 10, the contacts 202b of the recycling control relay 202 are adapted momentarily to connect the condenser 260 across the inductance of the winding 193' whenever the recycling control relay 202 is energized. It will be apparent that the arrangement for desensitizing the recycling control channel at the instant of logging and making the recycling control channel normally more sensitive than the 5 kc. channel is a safety provision to prevent incorrect operation of the system.

If the receiver attachment is not connected to the receiver 10, but a microphone is employed as in the above mentioned Scherbatskoy co-pending application, then it would also be undesirable to make a connection with the receiver 10 for obtaining a potential representative of the automatic volume control voltage. Under these conditions the low frequency amplifier 34a might be energized in response to a signal produced when the tuning of the wave signal receiver 10 is changed. For example, the tuning control or the push buttons of a receiver might be provided with a permanent magnet movable therewith. Associated with the permanent magnet could be a small stationary coil connected to the control electrode of the low frequency amplifier 234a. Movement of the tuning control and consequently of the permanent magnet would induce a current in the adjacent stationary coil to initiate the recycling device in the receiver attachment 13 and consequently cause an 8 kc. oscillation to be produced by the oscillator 240.

In view of the detailed description included above, the operation of the lock out device and automatic recycling control will be apparent and no further discussion thereof is included herein. It will furthermore be apparent that there has been provided a search signal type of apparatus for determining the listening habits of wave signal receiver users in which the disturbing variable pitch heterodyne note due to intermodulation of the search signal with the station carrier cannot occur. Furthermore, due to the lock out control and recycling feature it is not essential that the search tone be inaudible since it occurs only at the instant of tuning a receiver to a station and then does not again occur until a new station is tuned in. Although a separate search tone oscillator 89 is required as contrasted with one prior art arrangement, such oscillator is necessary for the frequency modulation section of the search signal generator 35 in either case so that this same oscillator might just as well be used with the section 35a of the search signal generator 35. The frequency stability of the search tone is very high since it depends solely on the frequency stability of the 5 kc. oscillator 89 which can be made very stable. The intensity of the search tone in the present invention is a less complicated function of the search signal intensity in receivers with automatic gain control than in some prior art arrangements. Furthermore with the present invention a symmetrical response is always provided regardless of the mistuning of the receiver.

It will be apparent by those skilled in the art that the present invention is not limited to the particular constructions and arrangements shown and described, but that changes and modifications may be made without departing from the spirit and scope of the invention, and it is aimed in the appended claims to cover all such changes and modifications.

What is claimed as new and desired to be secured by Letters Patent of the United States is:

1. In combination with a wave signal receiver tunable over a frequency range to receive any one of a plurality of signals radiated from different transmitters operating at different frequencies within the frequency range of said receiver, search signal generating means for generating a search signal variable in frequency over a predetermined frequency range which is at least partially coextensive with the frequency range over which said receiver is tunable, means for varying the frequency of said search signal generating means on a cyclic basis and for changing the frequency of said search signal in steps during each frequency change cycle, the frequencies of said search signal at said steps being respectively equal to the operating frequencies of different ones of said transmitting stations, means for transmitting said search signal to said receiver for reception thereby, means for modulating said search signal to produce a detectable modulation signal in said receiver when received thereby at the point in each frequency change cycle of said search signal when the frequency of said search signal is equal to the operating frequency of the transmitting station from which signals are being received by said receiver, and means linked to said receiver and responsive to detection of said modulation signal for producing an indication of the transmitting station to which said receiver is tuned for signal reception.

2. In combination with a wave signal receiver tunable over a frequency range to receive any one of a plurality of signals from different transmitters operating at different frequencies within the frequency range of said receiver, search signal generating means for cyclically generating a search signal variable in frequency in a predetermined stepwise fashion during each frequency change cycle thereof, the frequency produced at each step of said search signal generating means being equal to a different one of the operating frequencies of said transmitters, means for transmitting said search signal to said receiver for reception thereby, means for modulating said search signal with a signal having a frequency within the detectable audio frequency range of said receiver but near the upper limit of said range to produce an audio signal in said receiver when detected therein at the instant that the frequency of said search signal equals the transmitting frequency of the transmitter from which signals are being received by said receiver, and means linked to said receiver and responsive to the detection of said audio signal for producing an indication of the transmitting station to which said receiver is tuned for signal reception.

3. Apparatus for producing a record indicative of the listening habits of users of a wave signal receiver comprising, a crystal oscillator for cyclically generating a search signal receivable by said receiver, means for controlling said oscillator to produce each cycle of said search signal as a signal variable in frequency in a stepwise fashion, each step having a frequency equal to one of a plurality of different transmitting frequencies likely to be tuned in by said wave signal receiver, means for controlling said search signal to produce a response in the form of a signal of a predetermined frequency in said receiver when received thereby and detected therein at the instant during the search cycle that the frequency of a step of said search signal is equal to the frequency of the transmitter tuned in by said receiver, means at said receiver for filtering and amplifying said response, means for transmitting said response to a point remote from said receiver, and means at said remote point for further amplifying said response and recording the same with reference to time whereby a continuous record of the tuning condition of said receiver is obtained.

4. In a device for producing a record of the tuning condition of a wave signal receiver, means for cyclically generating a search signal variable in frequency in a predetermined stepwise fashion throughout each cycle, the frequency of each step being equal to a different one of the transmitting frequencies likely to be received by said receiver, means for transmitting said search signal for reception by said receiver, means for modulating said search signal with a signal in the audible frequency range of said receiver but near the upper limit of said range to produce a response in said receiver when detected therein at the instant that the frequency of a step of said search signal equals the transmitting frequency of a transmitter tuned in by said receiver, a receiver attachment capable of being disposed adjacent said receiver for picking up said response and filtering and amplifying the same, a recording device, and means for transmitting said response from said receiver attachment to said recording device.

5. Apparatus for producing a record of the tuning condition of a wave signal receiver comprising means for cyclically generating a search signal, means for controlling said first mentioned means so that each cycle of said search signal comprises a signal variable in frequency in a stepwise manner, each frequency step being equal to the transmitting frequency of a different one of a plurality of transmitting stations likely to be tuned in by said receiver, means for modulating said search signal with a signal in the audio frequency range capable of being substantially completely passed by a narrow pass band filter, means for transmitting said modulated search signal for reception by said receiver, whereby a response in the audio frequency range is produced in said receiver when said search signal is detected therein at the particular instant during the search cycle that the frequency of a step of said search signal equals the frequency of the transmitter tuned in by said receiver, the particular frequency step which causes the production of said response being indicative of the particular transmitting station to which said receiver is tuned, means independent of said receiver for picking up said response, means for filtering and amplifying said response, and means for producing a record of said amplified response.

6. In a device for determining the listening habits of users of a wave signal receiver comprising a crystal oscillator including a plurality of crystals each having a natural frequency bearing a predetermined relationship to the transmitting frequencies of a plurality of transmitting stations to which said receiver may be tuned for signal reception, rotary switching means for successively rendering said crystals effective one at a time in a cyclic manner to produce an oscillator output in the form of a search signal variable in frequency in a stepwise fashion during each cycle, a synchronous motor for driving said rotary switching means, means for modulating said search signal with a modulating component capable of being detected in said receiver, means for transmitting said search signal for reception by said receiver whereby a response is produced in said receiver when detected therein indicative of the transmitting station to which the receiver is tuned at the instant that the crystal bearing said predetermined frequency relationship to the transmitting frequency of the station tuned in by said receiver is effective to control the output frequency of said oscillator, means for recording said response comprising additional rotary switching means, and means drivingly interconnecting said additional rotary switching means and said synchronous motor.

7. In a device for determining the listening habits of users of a wave signal receiver comprising an oscillator including a plurality of means each having a natural frequency equal to a different one of the transmitting frequencies of a plurality of transmitting stations to which said receiver may be tuned for signal reception, a first rotary switching means for successively rendering each of said plurality of means effective one at a time in a cyclic manner to produce an oscillator output in the form of a search signal variable in frequency throughout both the amplitude modulation and frequency modulation bands in a stepwise fashion during each cycle, means for modulating said search signal with a frequency in the audible range capable of being passed by a narrow pass band filter, means including a second rotary switching means for transmitting said search signal for reception by said receiver and modulated with the signal from a transmitting station tuned in by said receiver whereby the modulation component of said search signal produces a response in said receiver when detected therein at the instant during said cycle that the one of said plurality of means whose frequency is equal to that of the transmitting frequency of the station tuned in by said receiver is effective to control the output frequency of said oscillator, and means for simultaneously driving said first and second rotary switching means in a predetermined manner with respect to time.

8. In a device for determining the listening habits of users of a wave signal receiver comprising an oscillator including a plurality of means each having a natural frequency equal to a different one of the transmitting frequencies of a plurality of transmitting stations to which said receiver may be tuned for signal reception, a first rotary switching means for successively rendering each of said plurality of means effective one at a time in a cyclic manner to produce an oscillator output in the form of a search signal variable in frequency in a stepwise fashion during each cycle, means for modulating said search signal with a frequency in the audible range capable of being passed by a narrow pass band filter, means including a second rotary switching means for transmitting said search signal for reception by said receiver and modulated with the signal from a transmitting station tuned in by said receiver whereby the modulation component of said search signal produces a response in said receiver when detected therein at the instant during said cycle that the one of said plurality of means whose frequency is equal to that of the transmitting frequency of the station tuned in by said receiver is effective to control the output frequency of said oscillator, means for recording said response comprising a third rotary switching means, and means for simultaneously driving said first, second and third rotary switching means in a predetermined manner with respect to time.

SERGE A. SCHERBATSKOY.

References Cited in the file of this patent

UNITED STATES PATENTS

| Number | Name | Date |
|---|---|---|
| 2,017,712 | Downey | Oct. 15, 1935 |
| 2,093,855 | Taylor | Sept. 21, 1937 |
| 2,131,558 | Granger | Sept. 27, 1938 |
| 2,157,576 | Schneider | May 9, 1939 |
| 2,249,324 | Potter | July 15, 1941 |
| 2,270,899 | Roder | Jan. 27, 1942 |
| 2,275,460 | Page | Mar. 10, 1942 |
| 2,344,562 | Potter | Mar. 21, 1944 |
| 2,383,322 | Koch | Aug. 21, 1945 |
| 2,421,106 | Wight | May 27, 1947 |
| 2,479,208 | Byrne et al. | Aug. 16, 1949 |
| 2,488,508 | Goldsmith | Nov. 15, 1949 |